United States Patent
You et al.

(10) Patent No.: US 9,730,250 B2
(45) Date of Patent: Aug. 8, 2017

(54) METHOD AND USER EQUIPMENT FOR TRANSMITTING UPLINK SIGNAL

(71) Applicant: LG ELECTRONICS INC., Seoul (KR)

(72) Inventors: Hyangsun You, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 14/782,736

(22) PCT Filed: Mar. 5, 2014

(86) PCT No.: PCT/KR2014/001803
§ 371 (c)(1),
(2) Date: Oct. 6, 2015

(87) PCT Pub. No.: WO2014/168336
PCT Pub. Date: Oct. 16, 2014

(65) Prior Publication Data
US 2016/0057784 A1    Feb. 25, 2016

Related U.S. Application Data

(60) Provisional application No. 61/810,739, filed on Apr. 11, 2013, provisional application No. 61/822,415, filed on May 12, 2013.

(51) Int. Cl.
*H04W 4/00* (2009.01)
*H04W 74/08* (2009.01)
*H04W 88/04* (2009.01)
*H04W 74/00* (2009.01)

(52) U.S. Cl.
CPC ..... *H04W 74/0833* (2013.01); *H04W 74/002* (2013.01); *H04W 88/04* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2007/0263579 A1* | 11/2007 | Ozluturk | H04W 74/004 370/338 |
| 2008/0279157 A1 | 11/2008 | Cuffaro et al. | |
| 2011/0051686 A1 | 3/2011 | Lee et al. | |
| 2012/0076095 A1 | 3/2012 | Zhang et al. | |
| 2012/0113939 A1* | 5/2012 | Kim | H04W 74/006 370/329 |
| 2012/0178482 A1* | 7/2012 | Seo | H04W 56/00 455/501 |

(Continued)

FOREIGN PATENT DOCUMENTS

| | | |
|---|---|---|
| KR | 10-2011-0023723 A | 3/2011 |
| KR | 10-2012-0113679 A | 10/2012 |
| WO | 2010/117235 A2 | 10/2010 |

*Primary Examiner* — Anh-Vu Ly
(74) *Attorney, Agent, or Firm* — Birch, Stewart, Kolasch & Birch, LLP

(57) ABSTRACT

The present invention provides a method and user equipment for transmitting an uplink signal capable of enhancing coverage while conserving energy by separating a cell for receiving a downlink from a cell for transmitting an uplink.

20 Claims, 7 Drawing Sheets

(56) References Cited

U.S. PATENT DOCUMENTS

| | | |
|---|---|---|
| 2012/0257569 A1 | 10/2012 | Jang et al. |
| 2014/0226630 A1* | 8/2014 | Comstock ............. H04W 16/14 370/331 |
| 2014/0328309 A1* | 11/2014 | Comstock ........... H04W 72/082 370/329 |
| 2015/0078286 A1* | 3/2015 | Kim .......................... H04L 1/18 370/329 |
| 2015/0223233 A1* | 8/2015 | Seo ....................... H04W 36/04 370/329 |

\* cited by examiner

FIG. 5
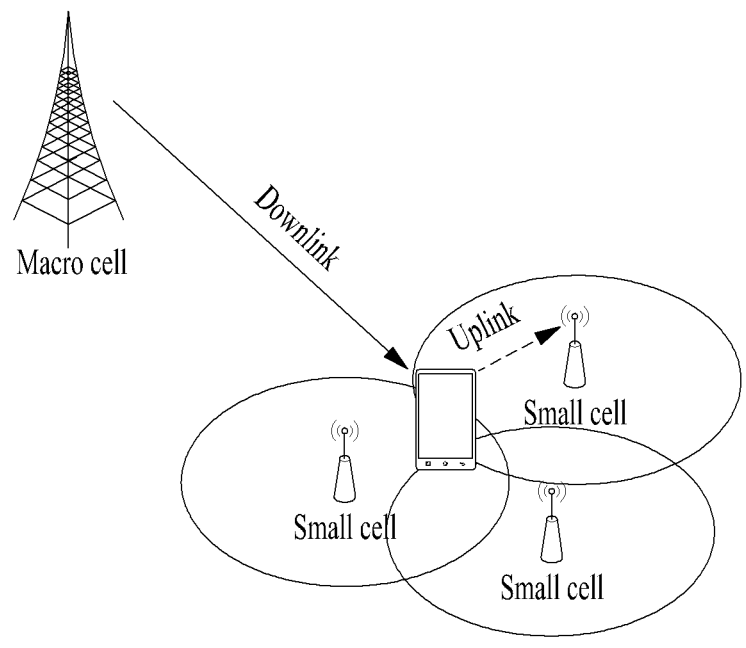
(a)
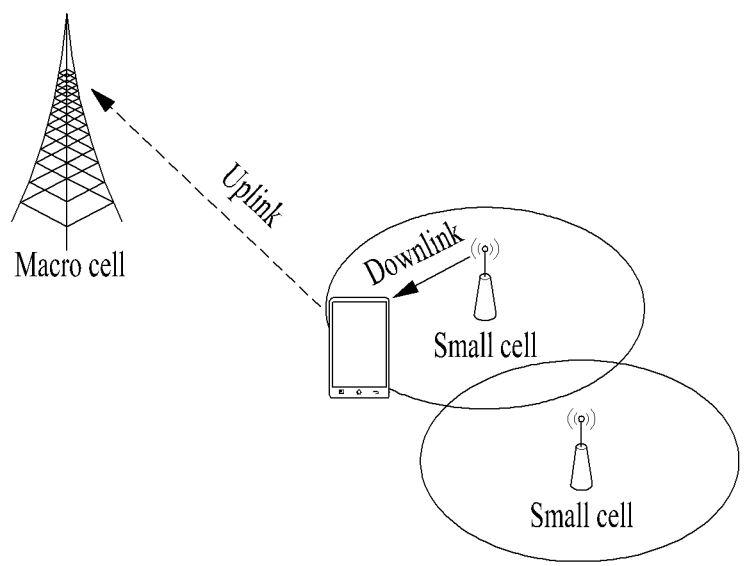

METHOD AND USER EQUIPMENT FOR TRANSMITTING UPLINK SIGNAL

CROSS REFERENCE TO RELATED APPLICATIONS

This application is the National Phase of PCT/KR2014/001803 filed on Mar. 5, 2014, which claims priority under 35 U.S.C. 119(e) to U.S. Provisional Application Nos. 61/810,739 filed on Apr. 11, 2013 and 61/822,415 filed on May 12, 2013, all of which are hereby expressly incorporated by reference into the present application.

TECHNICAL FIELD

The present invention relates to a wireless communication system and, more particularly, to a method for transmitting or receiving signals and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple antennas technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled in a prescribed time unit, e.g. subframe (SF). The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user equipment (UE) at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for transmitting an uplink signal by a user equipment, including receiving configuration information indicating a plurality of frequencies for uplink through a downlink operating frequency of a first cell; transmitting a physical random access channel (PRACH) on at least one frequency among the plurality of frequencies; receiving frequency information indicating an uplink operating frequency for the uplink signal as a response to transmission of the PRACH; and transmitting the uplink signal through the uplink operating frequency based on the frequency information.

In another aspect of the present invention, provided herein is a user equipment for transmitting an uplink signal, including a radio frequency (RF) unit and a processor configured to control the RF unit, wherein the processor controls the RF unit to receive configuration information indicating a plurality of frequencies for uplink through a downlink operating frequency of a first cell; controls the RF unit to transmit a physical random access channel (PRACH) on at least one frequency among the plurality of frequencies; controls the RF unit to receive frequency information indicating an uplink operating frequency for the uplink signal as a response to transmission of the PRACH; and controls the RF unit to transmit the uplink signal through the uplink operating frequency based on the frequency information.

In still another aspect of the present invention, provided herein is a method for receiving an uplink signal by a base station, including transmitting configuration information indicating a plurality of frequencies for uplink through a downlink operating frequency of a first cell; receiving a physical random access channel (PRACH) on at least one frequency among the plurality of frequencies; transmitting frequency information indicating an uplink operating frequency for the uplink signal as a response to reception of the PRACH; and receiving the uplink signal through the uplink operating frequency based on the frequency information.

In a further aspect of the present invention, provided herein is a base station for receiving an uplink signal, including a radio frequency (RF) unit and a processor configured to control the RF unit, wherein the processor controls the RF unit to transmit configuration information indicating a plurality of frequencies for uplink through a downlink operating frequency of a first cell; controls the RF unit to receive a physical random access channel (PRACH) on at least one frequency among the plurality of frequencies; controls the RF unit to transmit frequency information indicating an uplink operating frequency for the uplink signal as a response to reception of the PRACH; and controls the RF unit to receive the uplink signal through the uplink operating frequency based on the frequency information.

In each aspect of the present invention, the uplink operating frequency may be an uplink operating frequency of a second cell different from an uplink operating frequency of the first cell.

In each aspect of the present invention, the second cell may be a small cell having coverage less than a predetermined reference value.

In each aspect of the present invention, the second cell may have power less than a specific reference value.

In each aspect of the present invention, the first cell may be a macro cell having coverage greater than a predetermined reference value.

In each aspect of the present invention, the first cell may have power greater than a specific reference value.

In each aspect of the present invention, a timing advance (TA) value for transmitting the PRACH through a downlink operating frequency of the second cell may be provided to the user equipment and the TA value may be '0'.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system can be raised.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 5 illustrates a signal transmission/reception method according to an embodiment of the present invention.

MODE FOR CARRYING OUT THE INVENTION

Figure 1:
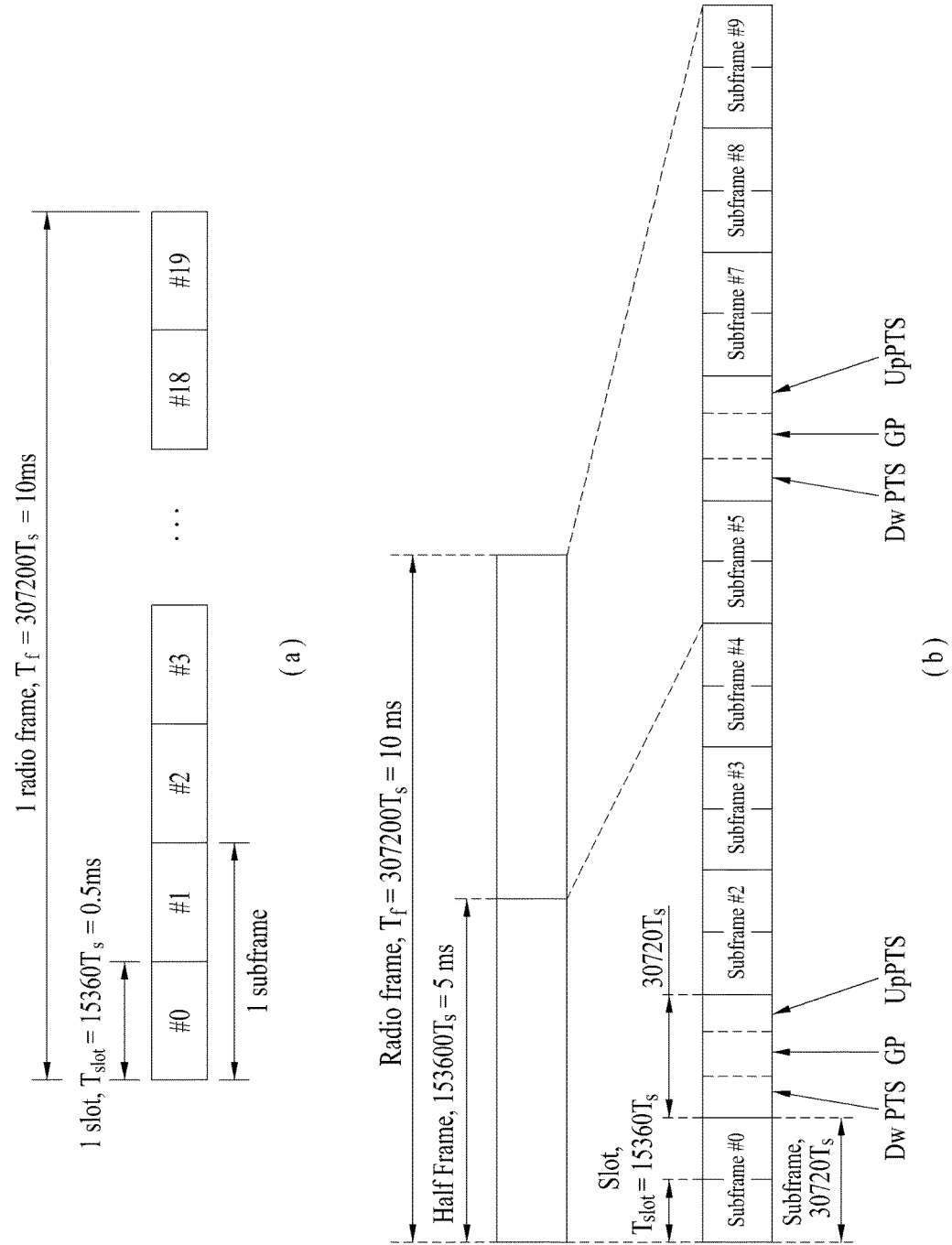
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. Especially, a cell which provides a UL/DL communication service to a UE is referred to as a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). CCs may be contiguous or non-contiguous in the frequency domain. An evolved universal terrestrial radio access (E-UTRA) operating band of Table 5 may be used in, without being limited to, CA.

TABLE 5

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| . | | | |
| . | | | |
| . | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note:
[1]Band 6 is not applicable.

The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. In FDD, since a UL operating band is different from a DL operating band, different carrier frequencies are linked to form one cell and a system information block type 2 (SIB2) linkage indicates a frequency different from a DL CC accessed by a UE as a frequency of a UL CC. In other words, in FDD, a DL CC constituting one cell and a UL CC linked to the DL CC operate on different frequencies. In TDD, since the UL operating band and the DL operating band are equal, one carrier frequency constitutes one cell and the SIB2 linkage indicates the same frequency as a DL CC accessed by the UE as a frequency of a corresponding UL CC. In other words, in TDD, a DL CC constituting one cell and a UL CC linked to the DL CC operate on the same frequency.

In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDCCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, a PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
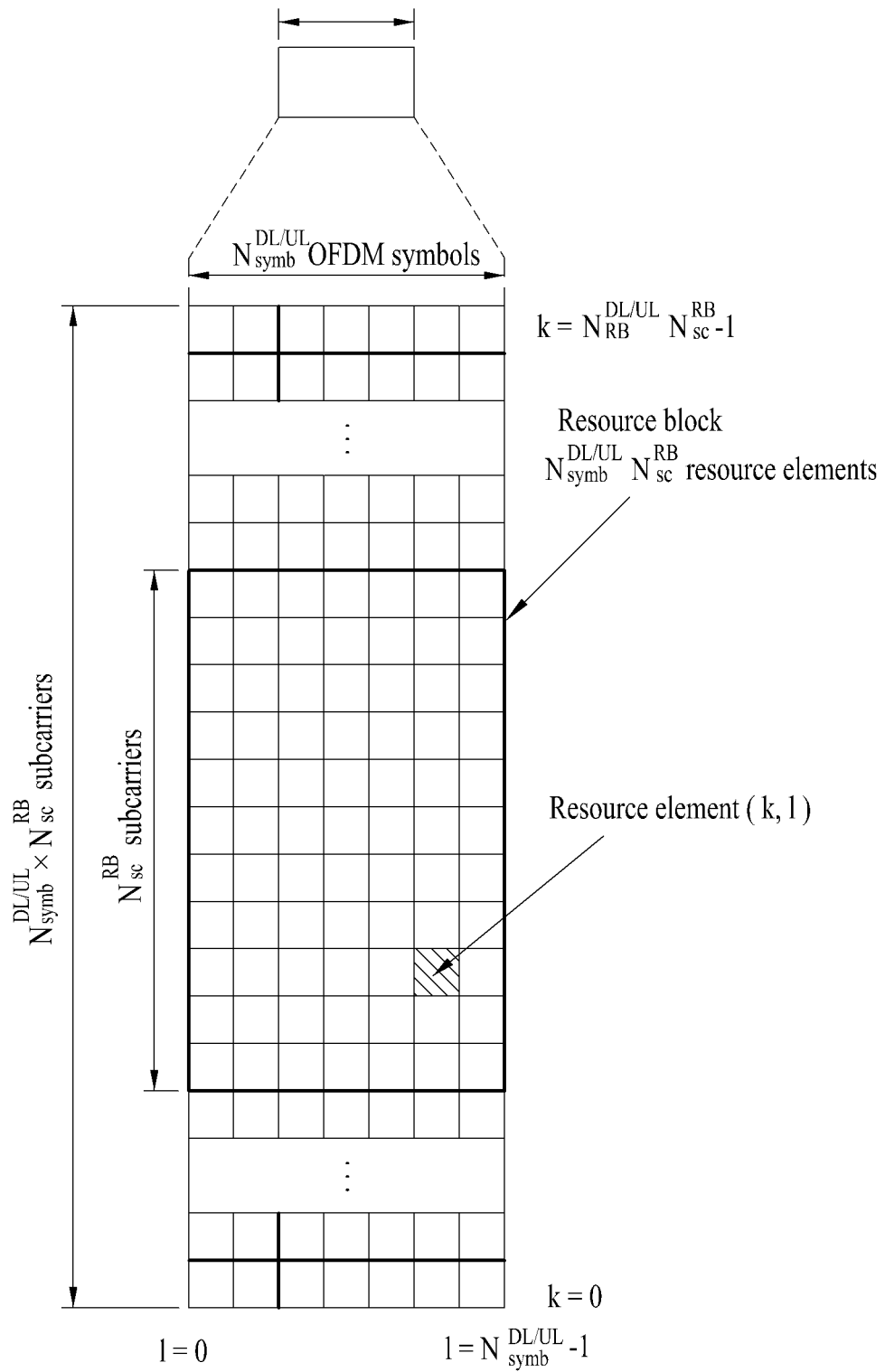
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1 - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
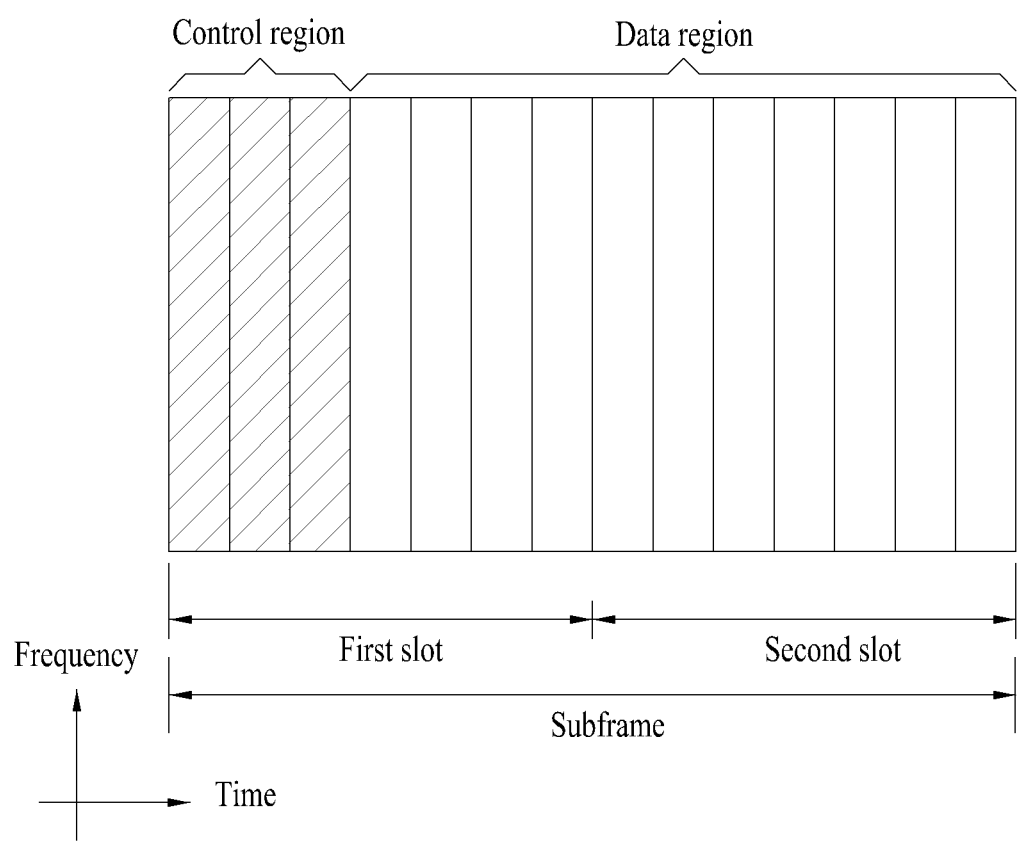
FIG. 3 illustrates the structure of a DL subframe used in a wireless communication system.

FIG. 3 illustrates the structure of a DL subframe used in a wireless communication system.

A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. For example, a PDCCH including n consecutive CCEs may be initiated only on CCEs satisfying 'i mod n=0'. Herein, i denotes a CCE index (or a CCE number).

The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Generally, a DCI format capable of being transmitted to a UE differs according to a transmission mode (TM) configured for the UE. In other words, for the UE configured for a specific TM, only some DCI format(s) corresponding to the specific TM rather than all DCI formats may be used. For example, the UE is semi-statically configured by higher layers so as to receive PDSCH data signaled through a PDCCH according to one of a plurality of predefined TMs. To maintain operation load of the UE according to blind decoding attempt at a predetermined level or less, all DCI formats are not always simultaneously searched by the UE. Table 3 illustrates a transmission mode for configuring multi-antenna technology and a DCI format where the UE performs blind decoding in accordance with the corresponding transmission mode. In particular, Table 3 illustrates a relation between PDSCH and PDCCH configured by C-RNTI.

TABLE 3

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |

TABLE 3-continued

| Transmission mode | DCI format | Search Space | Transmission scheme of PDSCH corresponding to PDCCH |
| --- | --- | --- | --- |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-1 |

Although TMs 1 to 9 are shown in Table 3, other TMs as well as the TMs defined in Table 3 may be defined.

In order for the receiving device to restore a signal transmitted by the transmitting device, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS.

For reference, demodulation may be understood as the meaning of a part of a decoding process and, in the present invention, the term decoding may be used instead of the term demodulation.

Figure 4:
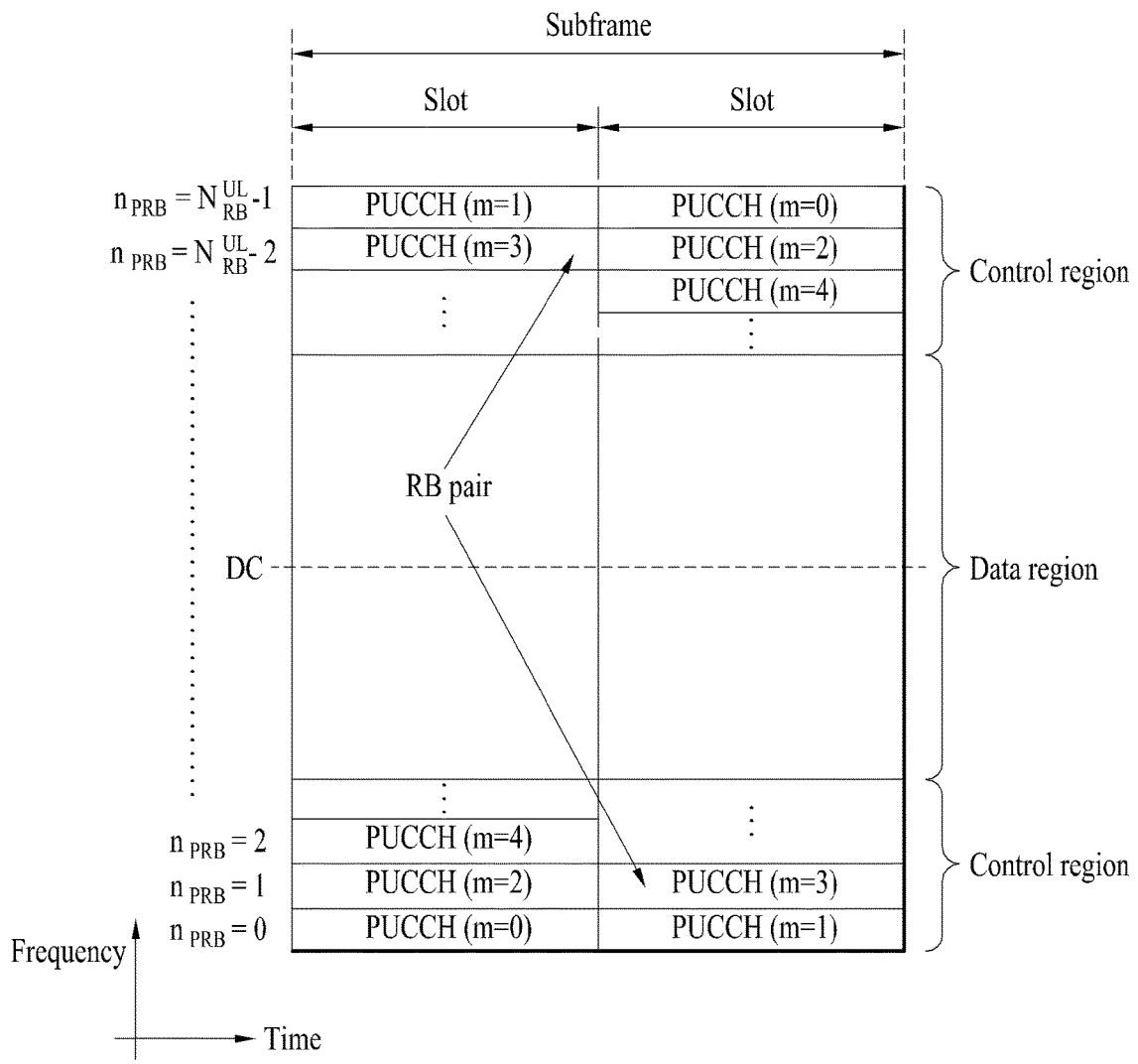
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

An RS may be transmitted on UL as well as DL. For example, a PUCCH DMRS is transmitted together with a PUCCH to demodulate the PUCCH and a PUSCH DMRS is transmitted together with a PUSCH to demodulate the PUSCH. To enable an eNB to measure a UL channel, an SRS may be transmitted.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

The present invention may be applied to an EPDCCH and a PUSCH, and a PDSCH and/or PUSCH scheduled by the EPDCCH, as well as a PDCCH and a PUCCH, and a PDSCH and/or PUSCH scheduled by the PDCCH. The EPDCCH is a physical control channel introduced to solve a capacity shortage problem of an existing PDCCH region and is configured in a data region (i.e. a PDSCH region) rather than the existing PDCCH region. In other words, unlike a PDCCH transmitted in the front OFDM symbol(s) of a subframe, the EPDCCH is configured on the back OFDM symbols starting from a configured OFDM symbol. The EPDCCH may be configured using contiguous frequency resources or may be configured using non-contiguous frequency resources for frequency diversity. For reference, a PDCCH is transmitted through the same antenna port(s) as antenna port(s) configured for transmission of a CRS and the UE configured to decode the PDCCH may demodulate or decode the PDCCH using the CRS. Unlike the PDCCH transmitted based on the CRS, the EPDCCH may be transmitted based on a demodulation RS (hereinafter, a DMRS). Therefore, the UE may decode/demodulate the PDCCH based on the CRS and decode/demodulate the EPDCCH based on the DMRS. The DMRS associated with the EPDCCH is transmitted over the same antenna port as a physical resource of the EPDCCH and is present for demodulation of the EPDCCH only when the EPDCCH is associated with the corresponding antenna port. In addition, the DMRS associated with the EPDCCH is transmitted only on PRB(s) to which the EPDCCH is mapped. Hereinafter, both the PDCCH and the EPDCCH will be simply referred to as the PDCCH except in cases specific to the EPDCCH.

When a plurality of CCs is used through aggregation in a legacy LTE/LTE-A system, if a PCC is present which can perform access to a stand-alone CC and transmission/reception of a control signal and data by enabling data transmission, cell ID acquisition, system information transmission, and physical control signal transmission and if an SCC is configured which can perform data transmission/reception only through aggregation with the PCC, it has been assumed that UL/DL frame time synchronization of the SCC is equal to time synchronization of the PCC on the assumption that CCs that are not far away from each other in the frequency domain are aggregated.

In addition, in the legacy LTE/LTE-A system, only the case in which aggregated CCs are used by one node and center frequencies of the CCs are adjacent to each other so that frequency characteristics are similar has been considered. However, the case in which CCs configured for the UE are used by a plurality of nodes separated by a predetermined distance or more rather than by one node may be considered and frequency aggregation between inter-frequencies having different frequency characteristics may also be considered. For example, a node of a PCC and a node of an SCC configured for a UE may be equal or different. If different nodes participate in CA using different CCs or the same CC, that is, if different cells participate in CA using the same CC or different CCs, the aggregated CC(s) may be connected by an ideal backhaul or a non-ideal backhaul. The ideal backhaul refers to a backhaul having very high throughput and very low latency, such as a dedicated point-to-point connection using an optical fiber or a line-of-sight (LOS) microwave link. In contrast, the non-ideal backhaul refers to a typical backhaul widely used in the market, such as a digital subscriber line (xDSL) or a non-line-of-sight (NLOS) microwave link. It may be assumed that the ideal backhaul has no latency in information exchange between cells or nodes. Hereinafter, if CCs connected by a non-ideal backhaul are aggregated, this is called an inter-site relation or inter-site CA relation in the present invention.

Meanwhile, introduction of a small cell having smaller size, i.e. narrower coverage than an existing cell has been considered. The existing cell having wider coverage than the small cell is called a macro cell. The small cell provides services in a narrower range than a range within which the existing cell or a CC can provide services by power or frequency characteristics of the corresponding cell. Since the small cell using a low power node can be easily arranged in indoor and outdoor hot spots, the small cell can be usefully used to handle explosive increase in communication traffic. The low power node generally refers to a node having lower transmit power than transmit power of a macro node and a normal eNB. For example, a pico eNB and a femto eNB may be used as low power nodes. A pico cell, a femto cell, an RRH cell deployed by an RRH, a relay cell deployed by a relay, and/or a repeater cell deployed by a repeater may become the small cell. The small cell may be interpreted as a cell having narrow coverage, a low-power cell, and/or a cell using a CC on which signals are transmitted with low power. In the present invention, a network in which the macro cell and the small cell co-exist despite use of the same radio access technology (RAT) is referred to as a heterogeneous network. In addition, in the present invention, a network consisting only of macro cells and a network consisting only of small cells is referred to as a homogeneous network. The small cell may be used as a Pcell or an Scell of a specific UE. In other words, a CC forming the small cell may be a CC configured as a Pcell or a CC configured as an Scell for a specific UE. Likewise, a CC forming the macro cell may be used as a Pcell or an Scell by a specific UE. In other words, each of a PCC (i.e. Pcell) and an SCC (i.e. Scell) may be the macro cell or the small cell.

When a UE having low mobility needs to perform high throughput data transmission, data transmission efficiency can be raised by use of the small cell. The small cell may be deployed in a current frequency band or in a frequency band which is not currently used but can be used in the future. If the cell is deployed using a high frequency band (e.g. a band of 3.5 GHz), channel characteristics may be variously changed according to time, frequency, or (geographical/spatial) position. Meanwhile, since coverage of the small cell is narrow, if a UE has high mobility, the UE needs to immediately leave the coverage of the small cell and be handed over to another cell. For this reason, overhead in small cells more frequently occurs than in normal cells. However, if a small cell is used for a UE having very low mobility, channel characteristics for the UE in the small cell are not abruptly changed and can be stably maintained.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes). In this case, however, if the PDSCH is transmitted in a subframe in which the PDCCH is transmitted, coverage enhancement may impose a heavy burden on a UE or an eNB in terms of delay or buffer size because the UE should buffer the PDSCH for all subframes in which the PDCCH is transmitted until the UE successfully receives the PDCCH. In particular, on UL requiring more powerful coverage enhancement relative to DL due to power restriction etc., it may be difficult to achieve coverage enhancement of a desired level only by transmission of the PUSCH/PUCCH through repetition. Since embodiments of the present invention described hereinbelow are methods for coverage enhancement, the present invention may be applied not only to the MTC UE but also to other UEs having the coverage issue. Accordingly, the embodiments of the present invention may be applied to a UE operating in a coverage enhancement mode. For convenience of description, a UE configured to implement a coverage enhancement method according to the present invention is referred to as the MTC UE and a UE that is not configured to implement the coverage enhancement method according to the present invention is referred to as the legacy UE.

As described above, more coverage enhancement is needed in UL compared with DL. The present invention proposes that the MTC UE perform UL transmission through the small cell in consideration of the fact that UL requires more powerful coverage enhancement relative to DL.

FIG. 5 illustrates a signal transmission/reception method according to an embodiment of the present invention.

A UE connected to a macro cell to receive data may have difficulty in transmitting UL data/channels to the macro cell due to a UL coverage issue. In this case, to solve the UL coverage issue, a scheme may be considered in which the UE receives DL data/channels through the macro cell and transmits the UL data/channels through a small cell in the vicinity of the UE, as illustrated in FIG. 5(a).

The macro cell that the UE uses for DL transmission and the small cell that the UE uses for UL transmission may not be connected via an ideal backhaul. Even in this case, a DL cell and a UL cell may be separately used for an MTC UE using a traffic characteristic which occasionally generates less data and an MTC characteristic which is delay tolerant.

Meanwhile, if cell-specific data is transmitted to the MTC UE in the macro cell, wherein the cell-specific data is transmitted in the form of repetition/TTI bundling in multiple subframes for the purpose of coverage enhancement, such coverage enhancement may function as considerable overhead in an overall system. In order to distribute load caused by coverage enhancement, DL transmission may be performed through the small cell. In addition, because of considerable interference caused by small cell(s), transmission of UL data to the macro cell may be effective in reducing power consumption of partial UEs. Therefore, as illustrated in FIG. 5(b), a scheme for transmitting DL data/channels through the small cell and transmitting UL data/channels through a macro cell may also be considered.

In the present invention, the macro cell and the small cell may or may not be located in a co-channel. In other words, the macro cell and the small cell may or may not use the same channel frequency range. In the present invention, CCs that form the small cell(s) and the macro cell(s) may be CCs in different operating bands or CCs in the same operating bands. In other words, in the present invention, CCs that form cells (which are adjacent to each other or aggregated for a UE) may be inter-frequencies or intra-frequencies. If CCs that form different cells operate on the same center frequency, the cells formed by the CCs may be distinguished from each other by physical cell IDs or virtual cell IDs, associated with the CCs. A physical cell ID of a CC may be acquired by a primary synchronization signal (PSS) and a secondary synchronization signal (SSS) on the CC. For a virtual cell ID of a CC, if a UE is connected to any one of CCs that have an inter-site CA relation, virtual cell IDs of carrier-aggregated (small/macro) cells may be provided to the UE through the connected CC.

To separately operate a cell through which an MTC UE receives DL data/channels and a cell through which the MTC UE transmits UL data/channels, schemes described below may be applied. Hereinafter, a UL cell of a UE will be referred to as Cell_U and a downlink cell of a UE will be referred to as Cell_D. In a legacy communication system, Cell_U and Cell_D correspond to the same node, use the same (virtual or physical) cell ID, use the same scrambling ID, operate in the same frequency for TDD, or operate in frequencies on which UL and DL are linked to each other for TDD. In contrast, Cell_U and Cell_D in the present invention correspond to separated nodes, use different (physical or virtual) cell IDs, use different scrambling IDs, or operate in frequencies that are different and are not linked to each other.

The present invention may be used not only in the case in which a UL cell and a DL cell of a UE are distinguished by Cell_U and Cell_D, respectively, but also in the case in which one UE performs initial access using two cells, i.e. Cell_U and Cell_D, and transmits and/or receives (hereinafter, transmits/receives) data in a normal environment.

A. Initial Access

In the present invention, it is assumed that a cell that is connected to a UE so that the UE receives DL data/channels is Cell_D and a DL operating frequency of Cell_D is F_D. In the present invention, it is also assumed that a cell to which the UE transmits UL data/channels is Cell_U and a UL operating frequency of Cell_U is F_U. In this case, Cell_D may be a macro cell, Cell_U may be a small cell, and Cell_U and Cell_D may have an inter-site relation in which Cell_U and Cell_D are located in inter-sites and are connected via a non-ideal backhaul. Hereinafter, an eNB that manages/controls Cell_D will be referred to as eNB_D, an eNB that manages/controls Cell_U will be referred to as eNB_U, and embodiments of the present invention will be described in this context.

If a UE is powered on or desires to newly access a cell, the UE performs an initial cell search procedure including acquiring time and frequency synchronization with the cell and detecting a physical layer cell ID $N^{cell}_{ID}$ of the cell. To this end, the UE may receive synchronization signals, for example, a PSS and an SSS, from an eNB to thus establish synchronization with the eNB and acquire information such as a cell ID. In this way, for cell search/re-search, the UE may receive the PSS and the SSS from the eNB to establish synchronization with the eNB and acquire information such as a cell ID. Next, the UE may receive broadcast information in a cell managed by the eNB over a PBCH. The contents of a message of the PBCH may be represented by a master information block (MIB) in a radio resource control (RRC) layer. Specifically, the contents of the message of the PBCH are shown in Table 4.

TABLE 4

```
-- ASN1START
MasterInformationBlock ::=   SEQUENCE {
    dl-Bandwidth                 ENUMERATED {
                                   n6, n15, n25, n50, n75, n100},
    phich-Config                 PHICH-Config,
    systemFrameNumber            BIT STRING (SIZE (8)),
    spare                        BIT STRING (SIZE (10))
}
-- ASN1STOP
```

As shown in Table 4, the MIB includes DL bandwidth (BW), PHICH configuration, and a system frame number (SFN). For example, among the parameters of the MIB, the parameter dl-Bandwidth is a parameter indicating the number of RBs $N_{RB}$ on DL. This parameter may indicate a DL system bandwidth in a manner that n6 corresponds to 6 RBs, and n15 corresponds to 15 RBs. Among the parameters of the MIB, the parameter sytemFrameNumber defines 8 most significant bits of an SFN. The two least significant bits of the SFN may be implicitly obtained by decoding the PBCH. The timing of 40 ms PBCH TTI indicates two least significant bits. For example, in the 40 ms PBCH TTI, the first radio frame indicates 00, the second radio frame indicates 01, the third radio frame indicates 10, and the last radio frame indicates 11. Accordingly, the UE may be explicitly aware of information about the DL BW, SFN, and PHICH configuration by receiving the MIB. Meanwhile, information which may be implicitly recognized by the UE through reception of the PBCH includes the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

When a UE accesses an eNB or a cell for the first time or does not have a radio resource allocated for transmission of a signal to the eNB or the cell, the UE may perform a random access procedure. To perform the random access procedure, the UE may transmit a specific sequence over a PRACH as a random access preamble, and receive a response message for the random access preamble over a PDCCH and/or a PDSCH corresponding to the PDCCH. Thereby, a radio resource necessary for signal transmission may be allocated to the UE. In the random access procedure, a UE identifier may be configured for the UE. For example, a cell radio network temporary identifier (C-RNTI) may identify the UE in a cell, and may be temporary, semi-persistent or permanent. A temporary C-RNTI may be allocated in a temporary access process, and may become a permanent C-RNTI after contention is resolved. A semi-persistent C-RNTI is used to schedule semi-persistent resources through a PDCCH. The semi-persistent C-RNTI is also called a semi-persistent scheduling (SPS)C-RNTI. A permanent C-RNTI has a C-RNTI value allocated after contention is resolved in the random access procedure, and is used to schedule a dynamic resource.

A UE according to an embodiment of the present invention performs DL synchronization by receiving a PSS/SSS of Cell_D in order to attempt to access Cell_D. Thereafter, the UE may acquire cell-specific information of a corresponding cell by receiving an MIB from Cell_D.

<Initial Access Scheme 1>

Upon receiving cell-specific information of a corresponding cell through DL synchronization, MIB reception, etc., the UE attempts to perform initial access with respect to Cell_D by transmitting a PRACH. A UE having a UL coverage issue may have difficulty in successfully transmitting the PRACH to Cell_D. To solve this problem, the UE may transmit the PRACH to be transmitted to Cell_D through a small cell in the vicinity of the UE. If an operating frequency of the small cell is F_U, the UE transmits the PRACH on the F_U. A cell receiving the PRACH transmitted by the UE is Cell_U.

The UE may not be aware of the UL operating frequency F_U of the small cell in the vicinity of the UE. To enable the UE to transmit the PRACH to the small cell, the present invention proposes that information about one or multiple frequencies (i.e. F_U) on which an MTC UE is capable of performing UL transmission be transmitted through an MIB or SIB of Cell_D. F_U may be set to a UL frequency of the small cell. In addition, to enable the UE to transmit the PRACH to Cell_U, the present invention proposes that information, such as a PRACH resource, a preamble transmit power, a preamble index, a timing advance (TA) value, etc., to be used by the MTC UE be provided to the UE through the MIB or the SIB of Cell_D. Alternatively, subframe(s) and/or RB(s), a preamble transmit power, a preamble index, a TA value, etc. of a resource on which the MTC UE is capable of transmitting the PRACH may be configured or predefined for the UE through the MIB or the SIB of Cell_D. The preamble index and the like are parameters related to PRACH transmission. For details of the parameters related to PRACH transmission, refer to the standard document 3GPP TS 36.211. An eNB receives a random access preamble transmitted by a UE through the random access procedure and calculates a TA value for shortening or delaying a transmission timing of the UE by use of information of the received random access preamble. The eNB may inform the UE of the calculated TA value through a random access response and the UE may update the transmission timing using the TA value. As another method for UL time arrangement, a sounding reference signal (SRS) may be used. The eNB receives a periodically or randomly transmitted SRS, calculate a TA value of the UE through the received SRS, and inform the UE of the calculated TA value. Then, the UE updates the transmission timing thereof. In a macro cell having a large cell radius, the TA value differs according to the location of the UE within the macro cell. However, in a small cell having a small cell radius, the TA value may be regarded as 0. In the present invention, eNB_D may inform the UE of the TA value which is always set to 0 in order to perform UL transmission of the MTC UE to the small cell.

If a plurality of frequencies for UL transmission is configured for the UE by eNB_D, the UE may transmit the PRACH in all or some frequencies among the plurality of frequencies. Upon receiving the PRACH, eNB(s) may inform, on a backhaul, eNB_D of the fact that the PRACH has been received and eNB_D may select a frequency to be used by the UE for UL transmission and inform the UE of information about F_U through a random access response (RAR) or an RRC signal.

<Initial Access Scheme 2>

To attempt to perform first access to Cell_D, the UE performs DL synchronization with Cell_D. Next, the UE acquires cell-specific information about Cell_D from Cell_D.

The UE may search for a small cell through which UL transmission is to be performed by itself without aid of eNB_D and transmit a PRACH to the small cell.

If the UE performs UL transmission through the small cell and performs DL transmission through the macro cell, the UE may receive UL discovery signals transmitted by small cell(s) in the vicinity of the UE in order to search for a small cell through which UL transmission is to be performed. To enable an MTC UE to use the small cell as a UL cell, the small cell may broadcast a UL discovery signal on a DL frequency F_D on which the macro cell operates. The UL discovery signal may contain information about a PRACH resource, a preamble transmit power, a preamble index, etc. The UL discovery signal may also contain information about a UL frequency of the small cell carrying the UL discovery signal so that the UE may transmit the PRACH and UL data/signals on the UL frequency.

The UE may select a UL discovery signal that the UE can best receive (e.g. a UL discovery signal having the greatest reference signal received power (RSRP) value) and transmit the PRACH using a UL frequency and PRACH resource related information contained in the UL discovery signal. In this case, the UL frequency on which the UE transmits the PRACH becomes F_U and an eNB that has transmitted the UL discovery signal selected by the UE becomes eNB_U.

In initial access scheme 1 and initial access scheme 2, if the UE transmits the PRACH on F_U, eNB_U may receive the PRACH and transmit the PRACH or information included in the PRACH to eNB_D on a backhaul. To successfully transmit the PRACH to eNB_D, eNB_U should be aware of information of Cell_D to which the PRACH is to be transmitted. For eNB_U to receive the PRACH and detect the information about Cell_D from the PRACH, the following methods may be used. First, information about an ID of Cell_D may be explicitly contained in the PRACH transmitted by the MTC UE. Alternatively, eNB_U that has received the PRACH transmitted by the MTC UE may be implicitly aware of the ID of Cell_D through a PRACH sequence, a preamble index, and/or a PRACH transmission resource. To cause eNB_U that has received the PRACH transmitted by the MTC UE to implicitly be aware of the ID of Cell_D through the PRACH sequence, the preamble index, and/or the PRACH transmission resource, eNB_D may inform, on a backhaul, eNB_U of information about the PRACH sequence, the preamble index, and/or the PRACH transmission resource that can be used by the PRACH transmitted to eNB_D.

B. Random Access Response (RAR) from Cell_D

RAR Window

If a UE transmits a PRACH, eNB_U that has received the PRACH may inform eNB_D of information or content about an RAR to be transmitted to the UE on a backhaul. eNB_D that has received the information or content about the RAR transmits the RAR to the UE over a PDSCH. In this case, the UE may expect that an RAR for the PRACH transmitted by the UE will be transmitted during subframe(s) corresponding to an RAR window from a specific subframe after transmitting the PRACH.

However, if the UE transmits, to Cell_U, the PRACH to be transmitted to eNB_D and eNB_U transmits information about the PRACH to eNB_D on a backhaul, a considerable delay occurs while eNB_D receives the PRACH from the UE compared with a conventional scheme. Therefore, if a DL cell and a UL cell are separated, an RAR window for the MTC UE that transmits/receives data needs to have a greater value compared with a conventional RAR window in the case in which the DL cell and the UL cell are coupled. That is, the RAR window for the MTC UE needs to have a greater value than an RAR window for a normal UE (having no coverage issue). The MTC UE may directly receive an RAR window value to be used thereby from eNB_D. Alternatively, the MTC UE may receive an RAR window value for the normal UE from eNB_D and derive an RAR window value to be used thereby from the RAR window value for the normal UE. For example, if the RAR window value received from eNB_D is W, the MTC UE may assume that the RAR window value applied thereto is W+X. In this case, a value corresponding to X may be prefixed or may be a value set by the eNB through an MIB or an SIB.

If the UE performs UL transmission through a small cell and performs DL transmission through a macro cell, since coverage of the small cell is very narrow relative to the macro cell, a TA value of the MTC UE that eNB_D transmits through a RAR may always be set to 0.

C. DL Data Transmission

An MTC UE that transmits/receives data through a DL cell Cell_D and a UL cell Cell_U that are separated receives a PDSCH through Cell_D. The PDSCH received through Cell_D may be received in one subframe or may be received over a bundle of multiple subframes (especially, in the form of being received in each of the multiple subframes so that reception of the PDSCH is repeated in the multiple subframes). If transmission of the PDSCH (repeatedly) performed in one or multiple subframes is completed in subframe n, the UE may transmit a PUCCH on F_U in subframe n+4. eNB_U that has received the PUCCH transmits information included in the PUCCH to eNB_D on a backhaul. Since eNB_D receives the PUCCH on the backhaul from eNB_U, eNB_D receives the PUCCH carrying ACK/NACK information for the PDSCH transmitted to the UE in subframe n+k (where k>=4) rather than in subframe n+4.

Alternatively, if transmission of the PDSCH (repeatedly) performed in one or multiple subframe(s) is completed in subframe n, the UE may transmit the PUCCH on F_U in subframe n+d (where d>=4). Upon receiving the PUCCH, eNB_U may transmit information included in the PUCCH to eNB_D on the backhaul. In this case, a value for d may be configured by eNB_D through an RRC signal or a PDCCH (DCI) or may be predefined. Since eNB_D receives the PUCCH on the backhaul from eNB_U, eNB_D receives the PUCCH carrying ACK/NACK information for the PDSCH transmitted to the UE in subframe n+k (where k>=d) rather than subframe n+4.

PUCCH Resource

The UE may receive information about a PUCCH resource for transmitting a PUCCH from eNB_D. The MTC UE may be configured to always use only PUCCH format 3 in order to transmit the PUCCH on F_U. The UE may obtain, through Cell_D, information about an ACK/NACK resource indicator (ARI) for obtaining information about a PUCCH format 3 resource. The ARI is used to indicate a specific PUCCH resource to be actually used by the UE for PUCCH transmission among a series of PUCCH resource candidates. The information about the ARI may be configured through an RRC signal or a PDCCH (DCI) from eNB_D. Alternatively, the PUCCH resource that can be used by the UE may always be fixedly predefined.

eNB_D that transmits a PDSCH to the UE may inform eNB_U of information about the PUCCH resource to be used by the UE on a backhaul. Alternatively, eNB_U may transmit, to eNB_D on a backhaul, information about the PUCCH resource that can be used by the UE to transmit the PUCCH to eNB_U.

D. UL Data Transmission

Scheduling

A PUSCH for an MTC UE that transmits/receives data through a DL cell Cell_D and a UL cell Cell_U separated from each other may be scheduled using semi-persistent scheduling (SPS). eNB_D may configure UL data transmission through SPS according to a traffic characteristic of the MTC UE so that the UE may periodically transmit the PUSCH on F_U.

eNB_D may inform eNB_U of information about an SPS allocated to the UE (e.g. a PUSCH resource or a PUSCH transmission subframe and/or period) on a backhaul. Alternatively, eNB_U may inform eNB_D of information about SPS which is suitable for eNB_U to receive the PUSCH (e.g. a PUSCH resource, a PUSCH transmission subframe and/or period, or a transmission mode) from the UE on a backhaul.

The MTC UE that transmits/receives data through a DL cell Cell_D and a UL cell Cell_U separated from each other may request scheduling for PUSCH transmission to eNB_D by transmitting a scheduling request (SR) through Cell_U. Alternatively, the MTC UE may cause eNB_D to allocate a PUSCH resource to the MTC UE by performing a buffer status report (BSR). Upon receiving the SR or the BSR, eNB_D may perform PUSCH scheduling by transmitting a UL grant to the UE over an (E)PDCCH, In this case, the eNB may pre-inform the UE of a PUCCH resource that can be used by the MTC UE to transmit the SR like a conventional scheme and eNB_D shares information about the PUCCH resource used by the UE to transmit the SR with eNB_U through a backhaul. Alternatively, eNB_U may inform eNB_D of the information about the PUCCH resource used by the UE to transmit the SR to eNB_U on the backhaul.

If eNB_D allocates a PUSCH to the MTC UE through a UL grant, eNB_D may inform eNB_U of information about UL grant, transmission of the PUSCH allocated to the UE (e.g. a PUSCH resource, a transmission mode, antenna configuration, or a part or all of information included in a PDCCH containing a UL grant) on the backhaul. Alternatively, eNB_U may inform eNB_D of information about transmission of the PUSCH that eNB_U is suitable to receive from the UE (e.g. a PUSCH resource, a transmission mode, antenna configuration, or a part or all of information included in a PDCCH containing a UL grant) on the backhaul.

eNB_U that has received the PUSCH from the MTC UE may transmit data received through the PUSCH to eNB_D through the backhaul.

UL DMRS eNB_U that actually receives the PUSCH transmitted by the MTC UE receives a UL demodulation reference signal (DMRS) that the UE transmits together with the PUSCH and uses the DMRS to demodulate the PUSCH.

The UL DMRS is defined by a cyclic shift of a base sequence according to a predetermined rule. For example, RS sequence $r_{u,v}^{(\alpha)}(n)$ is defined by a cyclic shift $\alpha$ of a base sequence $\bar{r}_{u,v}(n)$ according to the following equation.

$$r_{u,v}^{(\alpha)}(n) = e^{j\alpha n}\bar{r}_{u,v}(n), 0 \leq n < M_{sc}^{RS} \quad \text{[Equation 1]}$$

An RS for demodulating a UL signal carried by a PUSCH (hereinafter, a PUSCH DMRS) is transmitted on a layer basis. The PUSCH DMRS sequence $r_{PUSCH}^{(\lambda)}(\bullet)$ associated with layer $\lambda \in \{0, 1, \ldots, v-1\}$ may be defined by the following equation.

$$r_{PUSCH}^{(\lambda)}(m \cdot M_{sc}^{RS} + n) + w^{(\lambda)}(m) r_{u,v}^{(\alpha_\lambda)}(n) \quad \text{[Equation 2]}$$

where m=0, 1, n=0, ..., $M_{sc}^{RS}$−1, and $M_{sc}^{RS} = M_{sc}^{PUSCH}$. $M_{sc}^{PUSCH}$ denotes scheduled bandwidth for uplink transmission, expressed as a number of subcarriers. The orthogonal sequence $w^{(\lambda)}(m)$ is given by $[w^{\lambda}(0)\ w^{\lambda}(1)]=[1\ 1]$ for DCI format 0 if the higher-layer parameter Activate-DMRS-with OCC is not set or if the temporary C-RNTI was used to transmit the most recent uplink-related DCI for the transport block associated with the corresponding PUSCH transmission, otherwise it is given by the following table using the cyclic shift field in most recent uplink-related DCI for the transport block associated with the corresponding PUSCH transmission.

TABLE 6

Mapping of Cyclic Shift Field in uplink-related DCI format to $n_{DMRS,\lambda}^{(2)}$ and $[w^{(\lambda)}(0)\ w^{(\lambda)}(1)]$

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

The cyclic shift $\alpha_\lambda$ in a slot $n_s$ is given as $\alpha_\lambda = 2\pi n_{cs,\lambda}/12$, $n_{cs,\lambda}$ is defined as the following equation.

$$n_{cs,\lambda} = (n_{DMRS}^{(1)} + n_{DMRS,\lambda}^{(2)} + n_{PN}(n_s)) \bmod 12 \quad \text{[Equation 3]}$$

where, $n^{(1)}_{DMRS}$ is given by Table 7 according the parameter cyclicShift provided by a higher layer, $n_{DMRS,\lambda}^{(2)}$ is given by the cyclic shift for DMRS field in most recent uplink-related DCI for the transport block associated with the corresponding PUSCH, where the value of $n_{DMRS,\lambda}^{(2)}$ is given in Table 6.

TABLE 7

| cyclicShift | $n^{(1)}_{DMRS}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

For generation of DMRS transmitted by a UE, cyclic shift such as the above is applied.

The quantity $n_{PN}(n_s)$ is given by the following equation.

$$n_{PN}(n_s) = \sum_{i=0}^{7} c(8N_{symb}^{UL} \cdot n_s + i) \cdot 2^i \quad \text{[Equation 4]}$$

where c(i) is a pseudo-random sequence, the application of c(i) is cell-specific. The pseudo-random sequence generator for generation of c(i) is initialized with $c_{init}$ at the beginning of each radio frame. If no value for $N^{csh\_DMRS}_{ID}$ is configured by higher layers or a temporary C-RNTI has been used to transmit the latest UL-related DCI for a transport block associated with PUSCH transmission, the quantity $c_{init}$ is given by Equation 5 and, otherwise, $c_{init}$ is given by Equation 6.

$$c_{init} = \left\lfloor \frac{N^{cell}_{ID}}{30} \right\rfloor \cdot 2^5 + ((N^{cell}_{ID} + \Delta_{ss}) \bmod 30) \quad \text{[Equation 5]}$$

$$c_{init} = \left\lfloor \frac{N^{csh\_DMRS}_{ID}}{30} \right\rfloor \cdot 2^5 + \left(N^{csh\_DMRS}_{ID} \bmod 30\right) \quad \text{[Equation 6]}$$

In Equation 5 and Equation 6, $N^{cell}_{ID}$ is a physical cell ID and $\Delta_{ss} \in \{0, 1, \ldots, 29\}$ is a value set by a higher layer signal.

To correctly receive a DMRS from the UE, eNB_U should be aware of a cyclic shift value used to generate the DMRS. eNB_D may inform eNB_U of information about a cyclic shift value that the UE is to use for DMRS transmission on backhaul. For example, eNB_D may inform eNB_U of all or a part of information such as values o$\lambda\lambda$f $n^{(1)}_{DMRS}$, $n_{DMRS,\lambda}^{(2)}$, $c_{init}$, and $N^{csh\_DMRS}_{ID}$, and a cell ID of eNB_D which are used by the UE for DMRS transmission. Alternatively, eNB_U may inform eNB_D of information about a cyclic shift value that the UE desires to use for DMRS transmission on a backhaul. As another example, eNB_U may inform eNB_D of information about all or a part of values of $n^{(1)}_{DMRS}$, $n_{DMRS,\lambda}^{(2)}$, $c_{init}$, and $N^{csh\_DMRS}_{ID}$ that the UE desires to use for DMRS transmission. Alternatively, a cyclic shift value to be used by the MTC UE for DMRS transmission may always be predefined as a specific value.

HARQ

Figure 6:
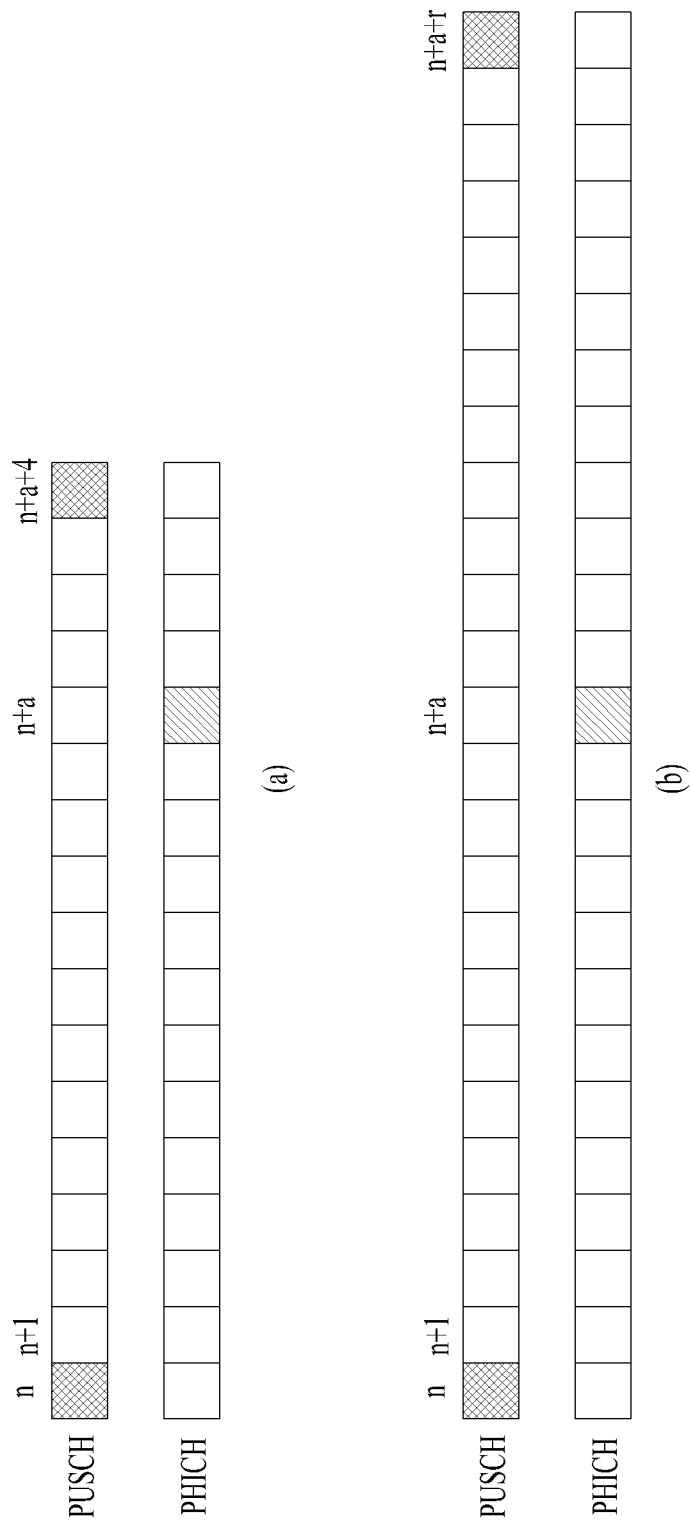
FIG. 6 illustrates a hybrid automatic repeat request (HARQ) according to an embodiment of the present invention.

FIG. 6 illustrates a hybrid automatic repeat request (HARQ) according to an embodiment of the present invention.

After an MTC UE that transmits/receives data through a DL cell Cell_D and a UL cell Cell_U separated from each other transmits a PUSCH, the MTC UE may not receive a PHICH carrying ACK/NACK information about PUSCH transmission from eNB_D. Alternatively, after the UE transmits the PUSCH, the UE may receive the PHICH carrying ACK/NACK information about PUSCH transmission from eNB_D, wherein it may be assumed that an interval between a subframe in which the PUSCH is transmitted and a subframe in which the PHICH is received is greater than that in a conventional scheme. For example, if the UE transmits the PUSCH in subframe n, the UE has conventionally expected that the PHICH and/or a UL grant (PDCCH) is to be received in subframe n+4, whereas the MTC UE may expect that the PHICH and/or the UL grant (PDCCH) is to be received in subframe n+a (where a>=4) as illustrated in FIG. 6. The value of a may be configured through an RRC signal or a PDCCH (DCI) by eNB_D or may be predefined.

The UE that has received the PHICH carrying NACK from eNB_D attempts to perform retransmission of the PUSCH. However, the MTC UE that transmits/receives data through a DL cell Cell_D and a UL cell Cell_U separated from each other may not attempt to retransmit the PUSCH even upon receiving NACK through the PHICH. Alternatively, as illustrated in FIG. 16(a), when the UE receives the PHICH in subframe n+a, the UE may perform retransmission of the PUSCH in subframe n+a+4. Alternatively, upon receiving the PHICH in subframe n, the UE performs retransmission of the PUSCH in subframe n+a+4 in a legacy system, whereas the MTC UE according to the present invention may perform retransmission of the PUSCH in subframe n+a+r (where r>=4) as illustrated in FIG. 16(b). In this case, the value of r may be set through an RRC signal or a PDCCH (DCI) by eNB_D or may be predefined. The value of r indicating an interval between a subframe in which the PHICH is received and a subframe in which the PUSCH is retransmitted may always be the same as a which is an interval between a subframe in which the PUSCH is transmitted and a subframe in which the PHICH is received.

E. UE Discontinuous Reception (DRX) and Small Cell on/Off

For energy saving or interference management, a cell may be powered off or a cell on/off interval during which transmission is performed or is not performed may be applied to a small cell. In addition, an MTC UE may frequently be in a DRX mode for long time because there is a high probability that data to be received and data to be transmitted are not frequently generated. A UE operating in the DRX mode repeatedly activates (on) and deactivate (off) reception performance thereof.

<UL Transmission Via Small Cell and DL Reception Via Macro Cell by UE>

In an environment in which a UE may be in a DRX mode for a long time and a small cell performs an on/off operation, even when eNB_D includes data to be transmitted to the UE, eNB_D may not transmit data because the UE is in the DRX mode. Alternatively, even when the UE includes UL data to be transmitted, the UE may not perform UL transmission because Cell_U is in an off state. To solve such problems, the following methods may be used.

Case in which Cell_U is in an Off State:
  when eNB_D has data to be transmitted to the UE but Cell_U is in an off state, eNB_D may request on a backhaul that eNB_U change Cell_U to an on state;

although eNB_D will transmit a UL grant to the UE but Cell_U is in an off state, eNB_D may request on the backhaul that eNB_U change Cell_U to an on state; and/or eNB_D may request on the backhaul that eNB_U change Cell_U to an on state at a PUSCH transmission timing according to SPS information of the UE.

Case in which UE is in DRX Mode:

if eNB_D has data to be transmitted to the UE and Cell_U is in an on state, eNB_D may request that eNB_U not change Cell_U to an off state and maintain Cell_U in an on state until the UE terminates the DRX mode;

if eNB_D has a plan to transmit a UL grant to the UE and Cell_U is in an on state, eNB_D may request that eNB_U not change Cell_U to an off state and maintain Cell_U in an on state until the UE terminates the DRX mode;

if eNB_D has data to be transmitted to the UE and Cell_U is an on state, eNB_D may request that eNB_U cause Cell_U to be in an on state at a time when the UE completes the DRX mode; and/or if eNB_D has a plan to transmit a UL grant to the UE and Cell_U is in an on state, eNB_D may request that eNB_U cause Cell_U to be in an on state at a time when the UE completes the DRX mode.

For the above operations, eNB_D may inform eNB_U on a backhaul of information about a remaining time until the UE completes the DRX mode.

For eNB_U to well receive UL data/signals from the UE, eNB_D may inform eNB_U on a backhaul of information about a DRX timing (e.g. a DRX duration) of the UE. In addition, eNB_U may inform eNB_D on the backhaul of information about a cell on/off timing (e.g. a timing offset or duration) thereof.

<UL Transmission Via Macro Cell and DL Reception Via Small Cell by UE>

In an environment in which a UE may be in a DRX mode for a long time and a small cell performs an on/off operation, even when eNB_D includes data to be transmitted to the UE, eNB_D may not transmit data because the UE is in the DRX mode. Alternatively, even when the UE includes DL data to be received, the UE may not perform DL reception because Cell_D is in an off state. To solve such problems, the following methods may be used.

Case in which Cell_U is in an Off State:

if an eNB_U has data to be transmitted to the UE and Cell_D is in an off state, eNB_U may request on a backhaul that eNB_D change Cell_D to an on state;

if eNB_U tries to transmit ACK/NACK information for a PUSCH received from the UE and Cell_D is in an off state, eNB_U may request on the backhaul that eNB_D change Cell_D to an on state; and/or for the UE to maintain DL synchronization with Cell_D, eNB_U may request on a backhaul that eNB_D change Cell_D to an on state according to a time period and a time offset for performing synchronization by the UE or a time period and a time offset for waking the UE from the DRX mode.

Case in which UE is in DRX Mode:

if eNB_U has data (e.g. ACK/NACK, a PDCCH, or a PDSCH) to be transmitted to the UE and Cell_D is in an on state, eNB_U may request that eNB_D not change Cell_D to an off state until the UE terminates the DRX mode; or if eNB_U has data (e.g. ACK/NACK, a PDCCH, or a PDSCH) to be transmitted to the UE and Cell_D is in an on state, eNB_U may request that eNB_D cause Cell_D to be in an on state until the UE completes the DRX mode.

Embodiments A to E of the present invention may be independently performed or two or more thereof may be performed together.

Figure 7:
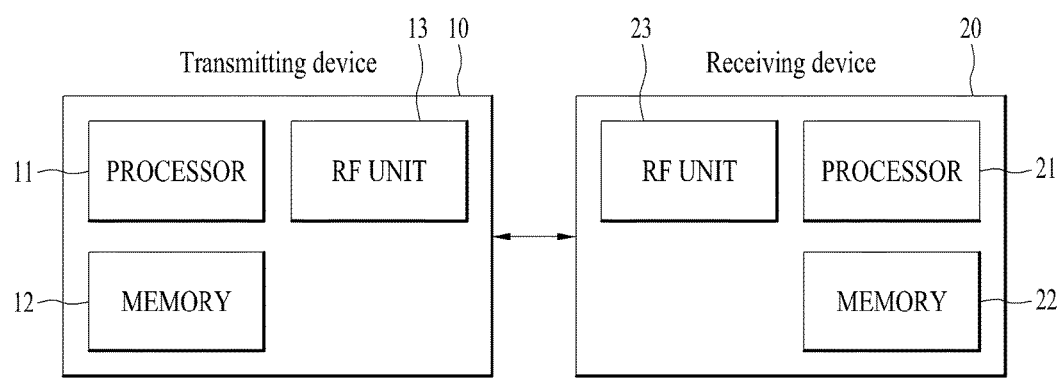
FIG. 7 is a block diagram illustrating elements of a transmitting device 10 and a receiving device 20 for implementing the present invention.

FIG. 7 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor of the present invention may control the UE RF unit to receive a PSS/SSS from Cell_D according to embodiment A and perform synchronization using the PSS/SSS. The UE processor may control the UE RF unit to receive an MIB, an SIB, etc. from Cell_D and acquire information specific to Cell_D from the MIB, the SIB, etc.

System information such as the MIB, the SIB, etc. received through Cell_D may include information such as a PRACH resource, a preamble transmit power, a preamble index, a TA value, etc for PRACH transmission. In the present invention, the TA value may always be set to 0. The UE RF unit may receive information for configuring a plurality of frequencies for UL from eNB_D or through Cell_D. The UE processor may perform initial access by transmitting a PRACH on at least one frequency among the plurality of frequencies. The UE RF unit may receive information indicating a UL operating frequency to be used for UL transmission (e.g. a PUCCH or a PUSCH) from eNB_D or Cell_D. The UE processor may control the UE RF unit to perform UL signal transmission (e.g. PUCCH transmission and/or PUSCH transmission) on the UL operating frequency.

The UE processor may be configured to search for, by itself, a small cell through which UL transmission is to be performed. The UE processor may control the UE RF unit to receive a UL discovery signal broadcast on F_D. The UL discovery signal may contain information for PRACH transmission, such as a PRACH resource, a preamble transmit power, a preamble index, etc. The UL discovery signal may also contain information about a UL frequency of a small cell that transmits the UL discovery signal. The UE processor may select a best received UL discovery signal and transmit, using a UL frequency and PRACH resource related information included in the UL discovery signal, the PRACH on the UL frequency.

The UE processor may attempt to receive an RAR for the PRACH transmitted by the UE RF unit during an RAR window of a larger value than the value of an RAR window for a legacy UE. Alternatively, the UE processor may attempt to receive the RAR during an interval of W+X corresponding to a value obtained by adding X to an RAR window value W received from eNB_D or Cell_D. In this case, X may be a prefixed value or may be a value set through system information from the eNB.

The UE processor may control the UE RF unit to receive a PSCH from Cell_D. The UE processor may attempt to receive the PDSCH in one subframe or multiple (consecutive DL) subframes. The UE processor may control the UE RF unit to transmit a PUCCH carrying ACK/NACK information for the PDSCH in subframe n+k which is the k-th subframe from the (last) subframe n in which the PDSCH is received. The UE processor may control the UE RF unit to transmit the PUCCH on F_U. The UE RF unit may receive information about a PUCCH resource for transmission of the PUCCH carrying the ACK/NACK from eNB_D or Cell_D. The UE processor may transmit the PUCCH using PUCCH format 3.

The UE RF unit may receive PUSCH allocation information through SPS. The UE processor may control the UE RF unit to transmit a PUSCH based on information about the SPS allocated to the UE.

The UE processor may control the UE RF unit to transmit a PUSCH DMRS for demodulating the PUSCH together with the PUSCH.

The UE processor may control the UE RF unit not to receive a PHICH carrying ACK/NACK for PUSCH transmission from eNB_D. Alternatively, if the UE processor controls the UE RF unit to transmit the PUSCH in subframe n, the UE processor may control the UE RF unit to receive a PHICH containing ACK/NACK information for PUSCH transmission and/or a UL grant from eNB_D in subframe n+a (where a>=4). In this case, a may be a value set by an RRC signal or DCI or may be a predefined value.

If ACK/NACK received through the PHICH of subframe n+a (where a>=4) is NACK, the UE processor may control the UE RF unit to perform retransmission of the PUSCH in subframe n+a+r (where r>=4).

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method for transmitting an uplink signal by a user equipment, the method comprising:
   accessing, by the user equipment, a first downlink operating frequency of a first cell by receiving a synchronization signal and a broadcast signal through the first downlink operating frequency of the first cell;
   receiving, by the user equipment, configuration information indicating a plurality of frequencies for uplink through the first downlink operating frequency of the first cell;
   performing, by the user equipment, a physical random access channel (PRACH) transmission for initial random access through at least one frequency among the plurality of frequencies;
   receiving, by the user equipment, a random access response (RAR) containing frequency information indicating a second uplink operating frequency among the plurality of frequencies through the first downlink operating frequency of the first cell in response to the PRACH transmission;
   performing, by the user equipment, an uplink channel transmission through the second uplink operating frequency, other than a first unlink operating frequency of the first cell, based on the frequency information; and
   performing, by the user equipment, a downlink channel reception for the user equipment through the first downlink operating frequency of the first cell, other than a second downlink operating frequency of a second cell different from the first cell,
   wherein the first cell is formed by the first downlink operating frequency and the first uplink operating frequency, and the second cell separate from the first cell is formed by the second downlink operating frequency and the second unlink operating frequency.

2. The method according to claim 1, wherein the second cell is a small cell having a coverage less than a predetermined reference value.

3. The method according to claim 2, further comprising:
   receiving a timing advance (TA) value for the PRACH transmission through the first downlink operating frequency of the first cell,
   wherein the TA value is '0'.

4. The method according to claim 1, wherein the first uplink operating frequency of the first cell is not used for uplink transmission of the user equipment, and the second downlink operating frequency of the second cell is not used for downlink transmission for the user equipment.

5. The method according to claim 1, wherein the user equipment is configured to apply a coverage enhancement scheme.

6. The method according to claim 1, further comprising:
   receiving, by the user equipment, a physical downlink shared channel (PDSCH) as the downlink channel reception through the first downlink operating frequency of the first cell; and
   transmitting, by the user equipment, a physical uplink control channel (PUCCH) carrying acknowledgment/negative-acknowledgment (ACK/NACK) information for the PDSCH as the uplink channel transmission through the second uplink operating frequency of the second cell,
   wherein if the PDSCH is received last in a subframe n, the PUCCH is transmitted in a subframe n+d,
   where d is a positive integer configured to be equal to or larger than 4 by the first downlink operating frequency of the first cell.

7. The method according to claim 6, further comprising:
   receiving, by the user equipment, information on a plurality of PUCCH resource candidates through the first downlink operating frequency of the first cell,
   wherein the PUCCH carrying ACK/NACK information for the PDSCH is transmitted through one of the plurality of PUCCH resource candidates which is indicated by downlink control information (DCI) for the PDSCH, and
   wherein the DCI for the PDSCH is received through the first downlink operating frequency of the first cell.

8. The method according to claim 1, further comprising:
   receiving, by the user equipment, semi-persistent scheduling (SPS) information indicating an uplink SPS resource as the downlink channel reception through the first downlink operating frequency of the first cell; and
   transmitting, by the user equipment, a physical uplink shared channel (PUSCH) using the uplink SPS resource as the uplink channel transmission through the second uplink operating frequency of the second cell.

9. The method according to claim 1, further comprising:
   transmitting, by the user equipment, a scheduling request through the second uplink operating frequency of the second cell;
   receiving, by the user equipment, a physical downlink control channel (PDCCH) carrying uplink grant information as the downlink channel reception through the first downlink operating frequency of the first cell; and
   transmitting, by the user equipment, a physical uplink shared channel (PUSCH) according to the uplink grant information through the second uplink operating frequency of the second cell.

10. The method according to claim 9, further comprising:
    receiving, by the user equipment, a physical hybrid-Automatic Repeat Request (ARQ) indicator channel (PHICH) carrying acknowledgment/negative-acknowledgment (ACK/NACK) information for the PUSCH through the first downlink operating frequency of the first cell,
    wherein if the PUSCH is transmitted in subframe n, the PHICH is received in subframe n+a,
    where a is a positive integer configured to be equal to or larger than 4 by the downlink operating frequency of the first cell.

11. A user equipment for transmitting an uplink signal, the user equipment comprising:
    a radio frequency (RF) unit and a processor configured to control the RF unit, the processor further configured to:
    access a first downlink operating frequency of a first cell by receiving a synchronization signal and a broadcast signal through the first downlink operating frequency of the first cell,
    control the RF unit to receive configuration information indicating a plurality of frequencies for an uplink through the first downlink operating frequency of the first cell,
    control the RF unit to perform a physical random access channel (PRACH) transmission for initial random access through at least one frequency among the plurality of frequencies,
    control the RF unit to receive a random access response (RAR) containing frequency information indicating a second uplink operating frequency among the plurality of frequencies through the first downlink operating frequency of the first cell in response to the PRACH transmission, control the RF unit to perform an uplink channel transmission through the second uplink operating frequency, other than a first unlink operating frequency of the first cell, based on the frequency information, and control the RF unit to perform a downlink channel reception for the user equipment through the first downlink operating frequency of the first cell, other than a second downlink operating frequency of a second cell different from the first cell, wherein the first cell is formed by the first downlink operating frequency and the first uplink operating frequency, and the second cell separate from the first cell is formed by the second downlink operating frequency and the second uplink operating frequency.

12. The user equipment according to claim 11, wherein the second cell is a small cell having a coverage less than a predetermined reference value.

13. The user equipment according to claim 12, wherein the processor controls the RF unit to further receive a timing advance (TA) value for the PRACH transmission through the downlink operating frequency of the first cell and wherein the TA value is '0'.

14. The user equipment according to claim 11, wherein the first uplink operating frequency of the first cell is not used for uplink transmission of the user equipment, and the second downlink operating frequency of the second cell is not used for downlink transmission for the user equipment.

15. The user equipment according to claim 11, wherein the user equipment is configured to apply coverage enhancement scheme.

16. The user equipment according to claim 11, wherein the processor is further configured to:

control the RF unit to receive a physical downlink shared channel (PDSCH) as the downlink channel reception through the first downlink operating frequency of the first cell, and control the RF unit to transmit a physical uplink control channel (PUCCH) carrying ACK/NACK information for the PDSCH as the uplink channel transmission through the second uplink operating frequency of the second cell, wherein if the PDSCH is received last in subframe n, the PUCCH is transmitted in subframe n+d, where d is a positive integer configured to be equal to or larger than 4 by the first downlink operating frequency of the first cell.

17. The user equipment according to claim 16, wherein the processor is further configured to control the RF unit to receive information on a plurality of PUCCH resource candidates through the first downlink operating frequency of the first cell, wherein the PUCCH carrying ACK/NACK information for the PDSCH is transmitted through one of the plurality of PUCCH resource candidates which is indicated by downlink control information (DCI) for the PDSCH, and wherein the DCI for the PDSCH is received through the first downlink operating frequency of the first cell.

18. The user equipment according to claim 11, wherein the processor is further configured to:

control the RF unit to receive semi-persistent scheduling (SPS) information indicating a uplink SPS resource as the downlink channel reception through the first downlink operating frequency of the first cell, and control the RF unit to transmit a physical uplink shared channel (PUSCH) using the uplink SPS resource as the uplink channel transmission through the second uplink operating frequency of the second cell.

19. The user equipment according to claim 11, wherein the processor is further configured to:

control the RF unit to transmit a scheduling request through the second uplink operating frequency of the second cell, control the RF unit to receive a physical downlink control channel (PDCCH) carrying uplink grant information as the downlink channel reception through the first downlink operating frequency of the first cell, and control the RF unit to transmit a physical uplink shared channel (PUSCH) according to the uplink grant information through the second uplink operating frequency of the second cell.

20. The user equipment according to claim 19, wherein the processor is configured to control the RF unit to receive a physical hybrid-Automatic Repeat Request (ARQ) indicator channel (PHICH) carrying acknowledgment/negative-acknowledgment (ACK/NACK) information for the PUSCH through the first downlink operating frequency of the first cell, wherein if the PUSCH is transmitted in subframe n, the PHICH is received in subframe n+a, where a is a positive integer configured to be equal to or larger than 4 by the downlink operating frequency of the first cell.

* * * * *